US 6,634,596 B2

(12) United States Patent
Albero et al.

(10) Patent No.: US 6,634,596 B2
(45) Date of Patent: Oct. 21, 2003

(54) AIRCRAFT SYSTEM ARCHITECTURE

(76) Inventors: Jose Albero, 669 Chateauneuf, Lachenaie, Quebec (CA), J6W 5P5; Louis J. Bruno, 2 Anthony Way, Ellington, CT (US) 06029; Richard Dussault, 550, avenue Curzon, St-Lambert, Quebec (CA), J4P 2V8; Charles E. Lents, 2320 Oxford St., Rockford, IL (US) 61103; Wayne A. Thresher, 8 Bellevue Ave., Springfield, MA (US) 01108-1742; Michael K. Sahm, 25 Zachary Dr., Avon, CT (US) 06001; Robert G. Thompson, 11640 Scripp Lake Dr., San Diego, CA (US) 92131

( * ) Notice: Subject to any disclaimer, the term of this patent is extended or adjusted under 35 U.S.C. 154(b) by 0 days.

(21) Appl. No.: 10/077,277

(22) Filed: Feb. 14, 2002

(65) Prior Publication Data
US 2002/0162914 A1 Nov. 7, 2002

Related U.S. Application Data

(60) Provisional application No. 60/269,597, filed on Feb. 16, 2001.

(51) Int. Cl.[7] .................................................. F02K 3/12
(52) U.S. Cl. ........................ 244/53 A; 244/53 R; 60/224
(58) Field of Search ............................... 244/53 R, 53 A, 244/55, 58; 60/224, 484

(56) References Cited

U.S. PATENT DOCUMENTS

| 3,693,354 A | * | 9/1972 | Hull, Jr. ....................... 60/765 |
| 4,091,613 A | * | 5/1978 | Young ........................... 60/785 |
| 4,183,211 A | * | 1/1980 | Menioux ....................... 60/224 |
| 4,817,892 A | * | 4/1989 | Janeke ......................... 244/15 |
| 5,239,830 A | | 8/1993 | Banthin et al. |
| 5,899,085 A | | 5/1999 | Williams |
| 5,939,800 A | | 8/1999 | Artinian et al. |
| 6,415,597 B1 | * | 7/2002 | Futamura et al. ............. 60/224 |
| 6,450,447 B1 | * | 9/2002 | Konrad et al. ............ 244/53 R |

FOREIGN PATENT DOCUMENTS

| GB | 2111602 A | 7/1983 |
| JP | 40-2095757 A | 4/1990 |

* cited by examiner

Primary Examiner—Robert P. Swiatek
(74) Attorney, Agent, or Firm—Bachman & LaPointe, P.C.

(57) ABSTRACT

An integrated aircraft system which comprises an aircraft frame, a nacelle cowl mounted to the aircraft frame, a primary gas turbine engine mounted within the nacelle cowl, a secondary power system incorporated within the nacelle cowl and being driven by a flow of air created by or through the engine, and an electrical power and cooling unit for supplying electrical power and cabin cooling air. The electrical power and cooling unit is pneumatically driven by engine bleed air.

24 Claims, 4 Drawing Sheets

AIRCRAFT SYSTEM ARCHITECTURE

CROSS REFERENCE TO RELATED APPLICATION (S)

This application claims the benefit of U.S. Provisional Patent Application Ser. No. 60/269,597, filed Feb. 16, 2001, entitled Improved Aircraft System Architecture.

BACKGROUND OF THE INVENTION

The present invention relates to an improved system architecture for an aircraft.

Modern aircraft have very complex systems for delivering electrical power to various aircraft components and for delivering energy to environmental control systems. These systems include shaft and gearbox driven systems that are prone to damage through use. As a result, these systems require a high level of maintenance and repair.

There is a need for an overall aircraft architecture which simplifies the systems onboard an aircraft and eliminates components prone to such damage.

SUMMARY OF THE INVENTION

Accordingly, it is an object of the present invention to provide an improved aircraft system architecture.

It is yet a further object of the present invention to provide an aircraft system architecture as above which utilizes engine integrated auxiliary power units.

It is yet a further object of the present invention to provide an aircraft system architecture as above which includes a pneumatically driven electrical power and cooling unit for supplying main channel electric power and cabin cooling air.

The foregoing objects are attained by the aircraft system of the present invention.

In accordance with the present invention, an integrated aircraft system comprises an aircraft frame, a nacelle cowl mounted to the aircraft frame, a primary gas turbine engine mounted within the nacelle cowl, a secondary power system incorporated within the nacelle cowl and being driven by a flow of air created by or through the engine, an electrical power and cooling unit for supplying electrical power and cabin cooling air, and the electrical power and cooling unit being driven by engine bleed air.

Other details of the aircraft system architecture of the present invention, as well as other objects and advantages attendant thereto are set forth in the following detailed description and the accompanying drawings in which like reference numerals depict like elements.

DETAILED DESCRIPTION OF THE PREFERRED EMBODIMENT(S)

Figure 1:
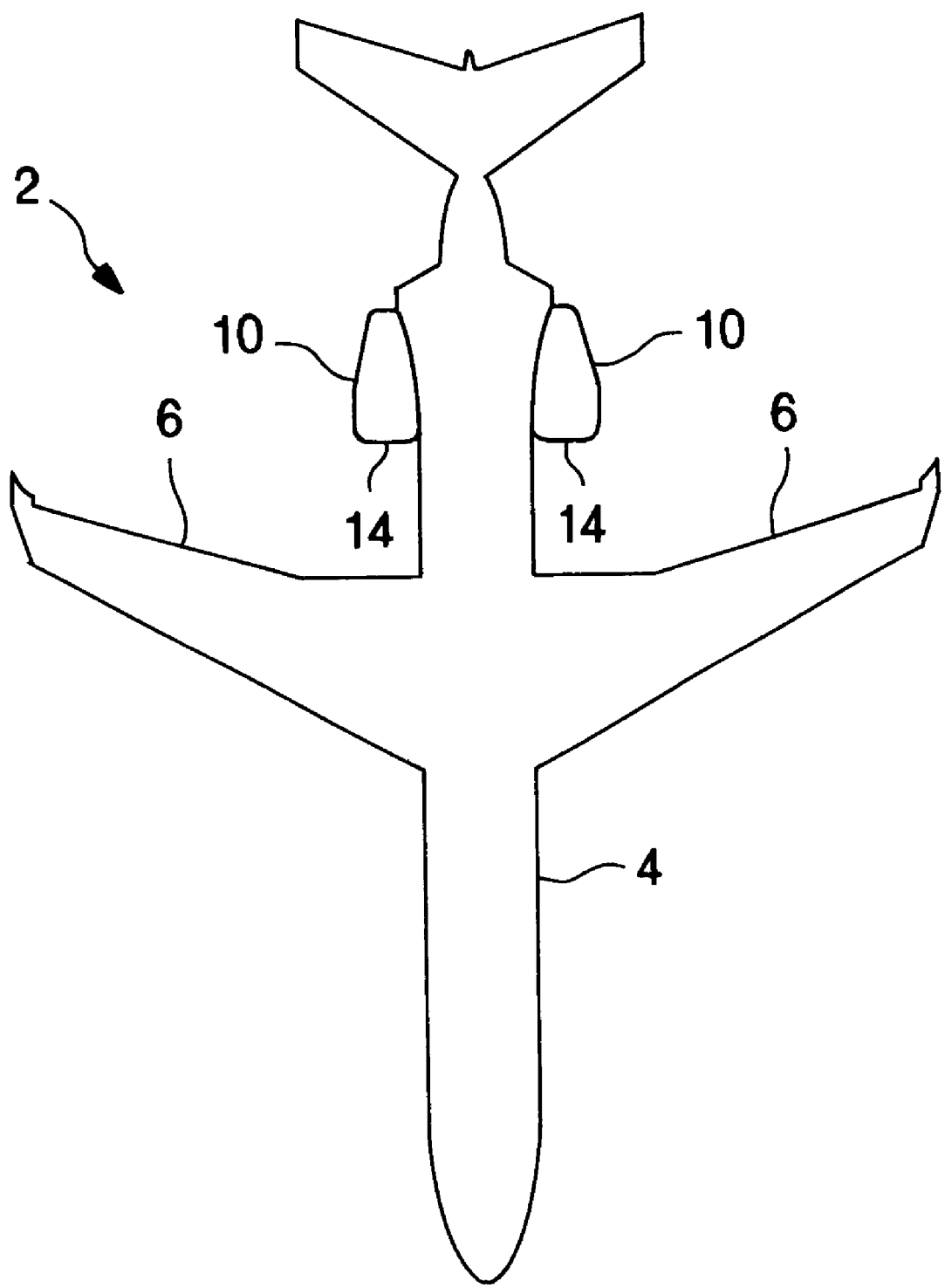
FIG. 1 is a schematic representation of an aircraft.

Referring now to the drawings, FIG. 1 is a schematic representation of an aircraft 2 having an airframe or fuselage 4 and a pair of power plants 10 mounted to the fuselage 4. While the power plants 10 have been shown as being mounted to the fuselage 4, they could alternatively be mounted beneath the wings 6 using any suitable means known in the art. Each of the power plants 10 contains a main engine 14. While the aircraft has been shown as having two main engines 14, it may have one or more than two engines if desired.

Figure 3:
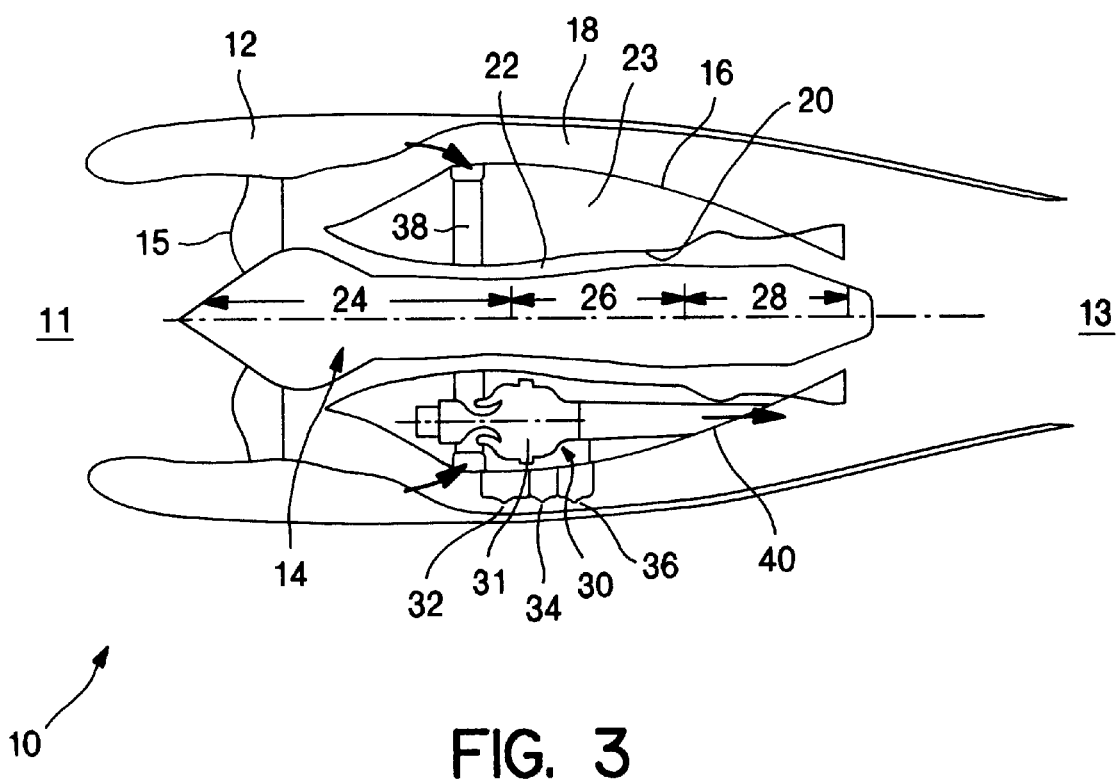
FIG. 3 is a schematic side view of an aircraft power plant wherein an auxiliary power unit is mounted in a core compartment of a main propulsion engine in accordance with a preferred embodiment of the present invention.

FIG. 3 illustrates an embodiment of a new aircraft power plant 10 to be used with the aircraft 2. Each power plant 10 comprises a nacelle cowl 12 having an inlet end 11 and an exhaust nozzle end 13, and a main propulsion engine 14 housed within the nacelle cowl 12. An inner core cowl 16 is concentrically mounted within the nacelle cowl 12 about the main propulsion engine 14. The inner core cowl 16 and the nacelle cowl 12 define therebetween an annular by-pass passage 18.

The main propulsion engine 14 has a casing assembly 20 defining an annular core flow passage 22. The casing assembly 20 defines with the inner core cowl 16 an engine core compartment 23 in which various components can be received.

The main propulsion engine 14 consists of a gas turbine engine having a compressor section 24 which typically includes a fan 15 and a high pressure compressor (not shown), a combustion section 26 and a turbine section 28, as is well known in the art. In operation, the gas turbine engine inducts ambient air via the inlet end 11. A portion of the air is diverted into the by-pass passage 18 and discharged at the exhaust nozzle 13. Before being directed into the by-pass passage 18, the air is compressed in the compressor section 24 of the gas turbine engine. The other portion of the air, which is drawn into the nacelle cowl 12, is caused to flow through the core flow passage 22. The air flowing through the core flow passage 22 is compressed in the compressor section 24 and is then directed to the combustion section 26 where it is mixed with fuel and ignited. The combustion gases from the combustion section 26 are then delivered to the turbine section 28 for driving the compressors (not shown) of the compressor section 24 and the engine accessories (not shown). The expanded gases from the turbine section 28 are discharged through the exhaust nozzle end 13 with the air emanating from the by-pass passage 18.

As seen in FIG. 3, a secondary power unit 30 is mounted within the engine core compartment 23 instead of being mounted to the aircraft tail section as is conventionally done. According to the illustrated embodiment, the secondary power unit 30 consists of an auxiliary power unit of the type used for starting the main propulsion engine pneumatically while the aircraft remains stationary on the ground.

The secondary power unit 30 includes a secondary gas turbine engine 31 having a compressor section 32, a combustion section 34, and a turbine section 36. As seen in FIG. 3, a radial inlet plenum 38 can be provided for allowing air to be drawn from the by-pass passage 18 directly into the gas turbine engine 31. The radial inlet plenum 38 could be provided in the form of a ring member defining a number of air passages extending radially through the engine core compartment 23 to convey air from the by-pass passage 18 to the secondary gas turbine engine 31. The secondary gas turbine engine 31 includes an axial exhaust duct 40 for directing the expanded gases from the gas turbine section 36 back into the by-pass passage 18.

During ground operation, the inlet air is drawn in through the stationary fan of the primary gas turbine engine, then through the by-pass passage 18 and finally into the secondary gas turbine engine 31 before being discharged back into an aft portion of the by-pass passage 18. In flight, the secondary gas turbine engine inlet flow is boosted by the main propulsion engine fan, as it is compressed thereby before entering into the secondary gas turbine engine 31. This provides for a better secondary gas turbine engine fuel burn when operated at altitude and allows relight capability at higher altitude. Aircraft pneumatic and electric power demand is typically provided on the ground by the secondary power unit 30 and the main engine 14 during flight conditions.

By integrating the secondary power unit 30 to the power plant 10 and, thus, eliminating the tail cone auxiliary power unit installation, significant installation and certification cost savings can be achieved for the airframers. This is also advantageous in that it eliminates the need for an aircraft fire zone and APU containment issues on tail plane, increases the cargo space, reduce pneumatic/hydraulic/fuel lines, and also allows for structural cost and weight savings.

The positioning of the secondary power unit 30 into the nacelle cowl 12 also provides for better main engine cold start capabilities due to the secondary power unit 30 preheating effect of the main engine core compartment 23. Indeed, while being operated, the secondary power unit 30 will generate heat that will contribute to warm up the various components of the main engine 14.

The re-light characteristics of the secondary power unit 30 will also be improved in flight due to a combination of some or all of the inlet boost and the ram air.

In a wing mounted application, the integration of the secondary power unit 30 with the main propulsion engine 14 into a single power plant will eliminate the need for costly pneumatic piping.

Figure 2A:
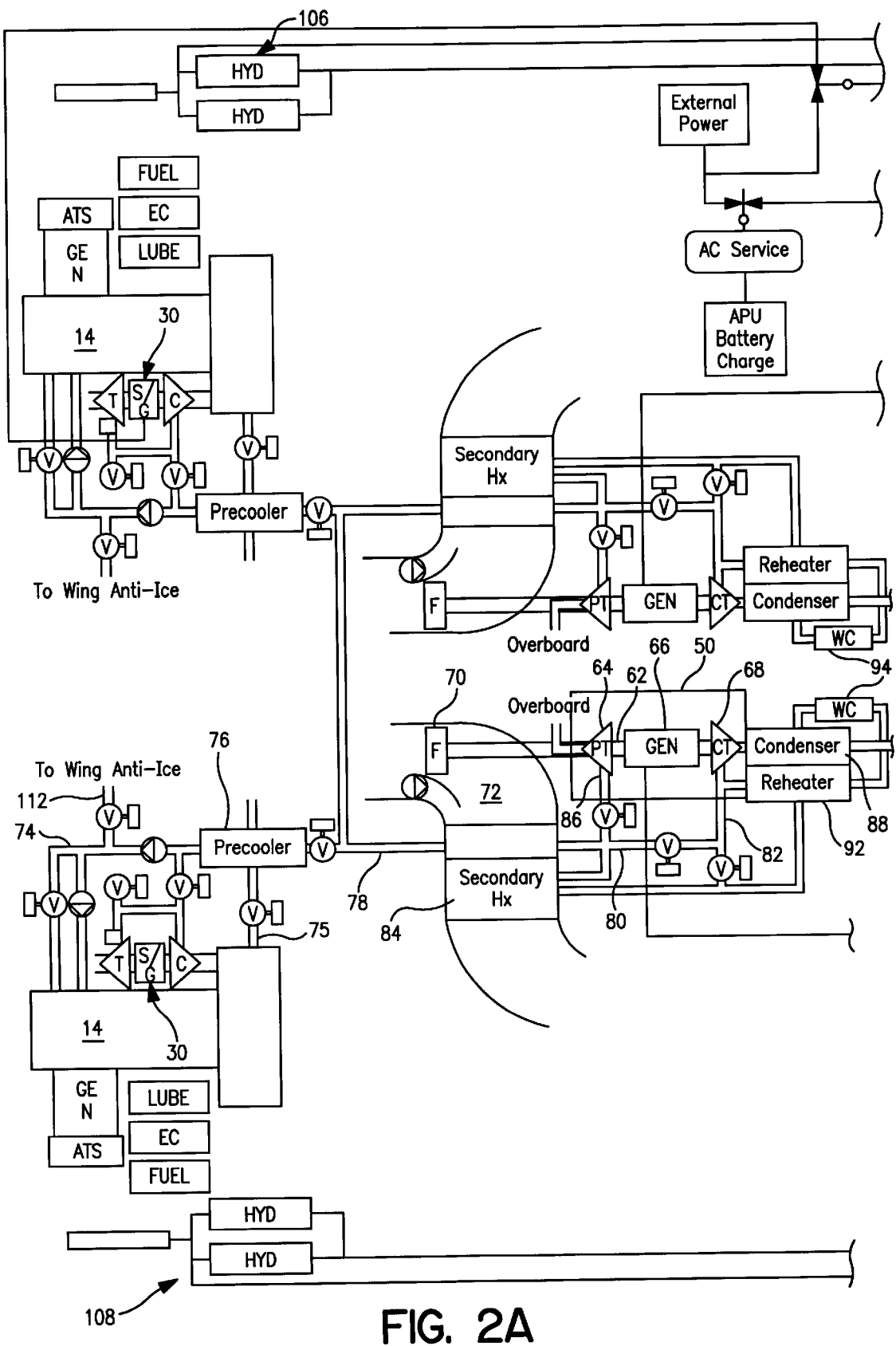
FIGS. 2A and 2B are schematic representations of a pneumatic system in accordance with the present invention.
Figure 2B:
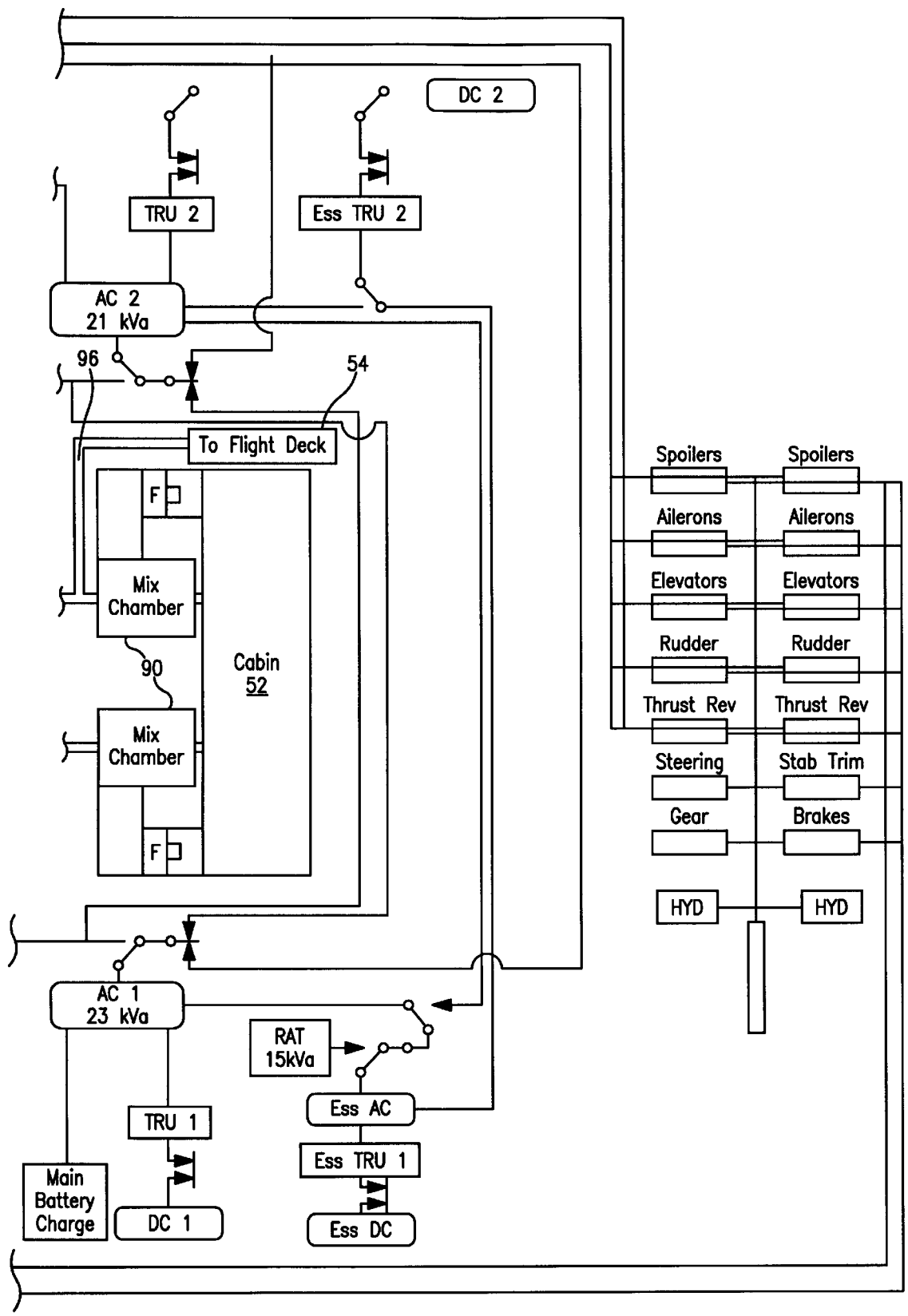

Referring now to FIGS. 2A and 2B, the pneumatic output of the secondary power unit 30 and bleed air from the engine 14 are fed to a pneumatically driven electric power and cooling unit 50 which is used to provide electrical power to the electrical systems onboard the aircraft 2 and cooling air to the cabin compartment 52 and the flight deck 54. The electric power and cooling unit 50 may have any suitable construction known in the art.

In a preferred embodiment, the unit 50 has a single rotating shaft 62 which may be journaled on non-oil lubricated bearings, such as air bearings or magnetic bearings, or any other suitable bearings known in the art. The unit includes a power turbine 64 mounted to the shaft 62, and electric generator 66 mounted to the shaft 62, and a cooling turbine 68 mounted to the shaft 62. The unit also includes a fan 70 mounted to the shaft 62 and positioned within a ram air duct 72.

The power and cooling turbines 64 and 68 respectively in each system 50 each receive bleed air from one of the main engines 14. Each engine 14 preferably has two bleed ports for delivering high temperature, high pressure high stage or mid-stage bleed air to delivery line 74. Whether high stage bleed air or mid stage bleed air is delivered to the line 74 depends on flight conditions. The bleed air in line 74 is delivered to precooler heat exchanger 76, preferably mounted in an engine nacelle. The precooler heat exchanger 76 receives first stage fan air via line 75 to cool the air delivered via line 74. In the precooler heat exchanger 76, the temperature of the bleed air is dropped.

The cooled bleed air exits the precooler heat exchanger 76 and passes through a secondary heat exchanger 84 where additional heat is removed so that the temperature of the bleed air is near ambient. The secondary heat exchanger 84 is preferably mounted in the ram air duct 72 and uses ram air as its cooling air.

At altitudes above 30,000 feet, the bleed air from the secondary heat exchanger is fed to the cooling turbine 68 via lines 80 and 82. The bleed air thus delivered drives the cooling turbine 68 which in turn drives the shaft 62 and the generator 66. If the cooling turbine 68 does not generate sufficient power to drive the generator 66, bleed air is also fed to the power turbine 64 via line 86. The power turbine 64 also causes the shaft 62 to rotate and thus drive the generator 66. Air exiting the power turbine 64 is dumped overboard. Air exiting the cooling turbine 68 passes through a condenser 88 where moisture is removed from the air. From the condenser, the cooled dry air is fed to a mix chamber 90 where it mixes with air recirculated from the cabin 52. From the mix chamber 90, the cooled dry air is introduced into the cabin 52.

At altitudes below 30,000 feet, there is a greater need to remove moisture from the bleed air. Thus, the bleed air from the secondary heat exchanger 84 passes through a loop containing reheater 92, the condenser 88, and a water collector 94. After passing back through the reheater 92, the dry air is supplied to the cooling turbine 68 where energy is extracted to drive the shaft 62. From the cooling turbine 68, the air is passed through the condenser 88 to the mix chamber 90 and then to the cabin 52.

A line 96 is provided so that fresh pressurized bleed air is always provided to the flight deck 54.

When the aircraft is on the ground, the bleed air necessary to the operation of the electric power and cooling unit may be supplied from an auxiliary power unit 30.

The electrical power generated by the electrical power and cooling unit 50 may be used to drive all of the electrical equipment onboard the airplane. For example, electrical pumps may be used in the hydraulic systems 106 and 108 to supply hydraulic fluid to operate the spoilers, the ailerons, the elevators, the rudders, the thrust reversers, steering equipment, and landing gear. Electrical power from the unit 50 may be supplied to operate the electric hydraulic pumps. Electrical power from the unit 50 may also be used to operate electrically operated fuel pumps (not shown) which supply fuel to the main engines 14 and electrical pumps (not shown) for driving lubrication systems on the aircraft.

Bleed air from the engines 14 may be fed via a line 112 from a low engine compressor stage to the wings for anti-icing purposes. If desired, a high stage bleed of engine air for creating makeup heat can be supplied along with the low engine stage bleed air to wing anti-icing devices. The wing anti-icing devices may comprise any suitable devices known in the art.

The architecture of the aircraft system of the present invention provides a number of advantages. For example, the system provides better cold start capability due to the elimination of a gear box and auxiliary power unit preheating of the main engine core compartment. Further, the auxiliary power unit is more efficient due to an improved ram recovery and/or turbocharge. Still further, the auxiliary power unit has better relight characteristics due to the turbocharge effect, improved ram air, and heat provided by the main engine. If desired, the auxiliary power unit may be provided with air bearings. This has the advantage of eliminating any need for an oil system or for a gearbox. The location of the auxiliary power unit in the system of the present invention means reduced ducting losses between the auxiliary power unit and the main engine.

It is apparent that there has been provided an aircraft system which fully satisfies the objects, means, and advantages set forth hereinbefore. While the present invention has been described in the context of the specific embodiments thereof, other variations, alternatives, and modifications will become apparent to those skilled in the art having read the foregoing description. Therefore, it is intended to embrace those variations, alternatives, and modifications which fall within the broad scope of the appended claim(s).

What is claimed is:

1. An integrated aircraft system comprising an aircraft frame, a nacelle cowl mounted to said aircraft frame, a primary gas turbine engine mounted within said nacelle cowl, a secondary power system incorporated within said nacelle cowl and being driven by a flow of air created by or through said primary gas turbine engine, an electrical power and cooling unit for supplying electrical power and cabin cooling air, said electrical power and cooling unit being pneumatically driven by engine bleed air, and said secondary power system comprising an auxiliary power unit for supplying pneumatic and electrical power to said aircraft and for starting said engine.

2. An integrated aircraft system comprising an aircraft frame, a nacelle cowl mounted to said aircraft frame, a primary gas turbine engine mounted within said nacelle cowl, a secondary power system incorporated within said nacelle cowl and being driven by a flow of air created by or through said primary gas turbine engine, an electrical power and cooling unit for supplying electrical power and cabin cooling air, said electrical power and cooling unit being pneumatically driven by engine bleed air, an inner core cowl and a casing assembly, said casing assembly defining an engine core compartment within said inner core cowl and said inner core cowl defining an annular by-pass passage with said nacelle cowl, said secondary power system being positioned within said engine core compartment, said second power system including a secondary gas turbine engine, and a radial inlet plenum for allowing air to be drawn directly into said secondary gas turbine engine.

3. An integrated aircraft system according to claim 2, wherein said radial inlet plenum is formed by a ring member defining a number of air passages extending radially through said engine core compartment.

4. An integrated aircraft system according to claim 2, further comprising an axial exhaust duct for directing expanded gases from said secondary gas turbine engine into said by-pass passage.

5. An integrated aircraft system comprising an aircraft frame, a nacelle cowl mounted to said aircraft frame, a primary gas turbine engine mounted within said nacelle cowl, a secondary power system incorporated within said nacelle cowl and being driven by a flow of air created by or through said primary gas turbine engine, an electrical power and cooling unit for supplying electrical power and cabin cooling air, said electrical power and cooling unit being pneumatically driven by engine bleed air, an inner core cowl and a casing assembly, said casing assembly defining an engine core compartment within said inner core cowl and said inner core cowl defining an annular by-pass passage with said nacelle cowl, said secondary power system being positioned within said engine core compartment, said secondary power system including a secondary gas turbine engine, and said primary gas turbine engine having a fan and during ground operation air is drawn in through said fan while said fan is stationary, through said by-pass passage, and then into said secondary gas turbine engine before being discharged back into an aft portion of said by-pass passage.

6. An integrated aircraft system according to claim 5, wherein during flight said fan compresses said air before said air enters said secondary gas turbine engine.

7. An integrated aircraft system comprising an aircraft frame, a nacelle cowl mounted to said aircraft frame, a primary gas turbine engine mounted within said nacelle cowl, a secondary power system incorporated within said nacelle cowl and being driven by a flow of air created by or through said primary gas turbine engine, an electrical power and cooling unit for supplying electrical power and cabin cooling air, said electrical power and cooling unit being pneumatically driven by engine bleed air, said electrical power and cooling unit having a shaft and a power turbine, an electrical generator, and a cooling turbine mounted on said shaft, said power turbine and said cooling turbine being supplied with bleed air from said primary gas turbine engine, and said primary gas turbine engine having two bleed ports for delivering at least one of high temperature, high pressure high stage bleed air and mid-stage bleed air to said electrical power and cooling unit.

8. An integrated aircraft system comprising an aircraft frame, a nacelle cowl mounted to said aircraft frame, a primary gas turbine engine mounted within said nacelle cowl, a secondary power system incorporated within said nacelle cowl and being driven by a flow of air created by or through said primary gas turbine engine, an electrical power and cooling unit for supplying electrical power and cabin cooling air, said electrical power and cooling unit being pneumatically driven by engine bleed air, said electrical power and cooling unit having a shaft and a power turbine, an electrical generator, and a cooling turbine mounted on said shaft, a fan positioned within a ram air duct, said fan being mounted to said shaft, a first heat exchanger means for cooling bleed air from said primary gas turbine engine and secondary heat exchanger means for removing heat from said bleed air exiting said first heat exchanger means.

9. An integrated aircraft system according to claim 8, wherein said secondary heat exchanger means is positioned within said ram air duct.

10. An integrated aircraft system according to claim 8, wherein bleed air exiting from said secondary heat exchanger means is delivered to said cooling turbine at altitudes above 30,000 feet and said cooling turbine drives said shaft and said generator.

11. An integrated aircraft system according to claim 10, wherein said bleed air is supplied to said power turbine when said cooling turbine does not generate sufficient power.

12. An integrated aircraft system according to claim 8, further comprising means for receiving air exiting from said secondary heat exchanger means and for drying said air and means for supplying said dried air to said cooling turbine.

13. An integrated aircraft system according to claim 12, further comprising means for delivering air exiting said cooling turbine to a mix chamber where said air is mixed with recirculated cabin air and means for introducing air from said mix chamber to a cabin onboard said aircraft.

14. An integrated aircraft system according to claim 13, further comprising a condenser for removing moisture from said air exiting said cooling turbine prior to said air being delivered to said mix chamber.

15. An integrated aircraft system comprising an aircraft frame, a nacelle cowl mounted to said aircraft frame, an inner core cowl defining an annular by-pass passage within said nacelle cowl, a primary gas turbine engine mounted within said nacelle cowl, a secondary power system incorporated within said nacelle cowl and being driven by a flow of air created by or through said primary gas turbine engine, an axial exhaust duct for directing expanded gases from said secondary power system into said by-pass passage, an electrical power and cooling unit for supplying electrical power and cabin cooling air, and said electrical power and cooling unit being pneumatically driven by engine bleed air.

16. An integrated aircraft system according to claim 15, further comprising a casing assembly, said casing assembly defining an engine core compartment with said inner core cowl, and said secondary power system being positioned within said engine core compartment.

17. An integrated aircraft system according to claim 16, wherein said secondary power system includes a secondary gas turbine engine.

18. An integrated aircraft system according to claim 15, further comprising said aircraft having wings and bleed air from said primary gas turbine engine being supplied to said wings for anti-icing purposes.

19. An integrated aircraft system according to claim 15, wherein said electrical power and cooling unit has a shaft and a power turbine, an electrical generator, and a cooling turbine mounted on said shaft.

20. An integrated aircraft system according to claim 19, wherein said power turbine and said cooling turbine are supplied with bleed air from said primary gas turbine engine.

21. An integrated aircraft system according to claim 19, further comprising a fan positioned within a ram air duct and said fan being mounted to said shaft.

22. An integrated aircraft system comprising an aircraft frame, a nacelle cowl mounted to said aircraft frame, a primary gas turbine engine mounted within said nacelle cowl, a secondary power system incorporated within said nacelle cowl and being driven by a flow of air created by or through said primary gas turbine engine, an electrical power and cooling unit for supplying electrical power and cabin cooling air, said electrical power and cooling unit being pneumatically driven by engine bleed air, and a radial inlet plenum for allowing air to be drawn directly into said secondary power system.

23. An integrated aircraft system comprising an aircraft frame, a nacelle cowl mounted to said aircraft frame, a primary gas turbine engine mounted within said nacelle, a secondary power system incorporated within said nacelle cowl and being driven by a flow of air created by or through said primary gas turbine engine, an electrical power and cooling unit for supplying electrical power and cabin cooling air, said electrical power and cooling unit being pneumatically driven by engine bleed air, said primary gas turbine engine having a fan and during ground operation air is drawn in through said fan while said fan is stationary, through a by-pass passage, and into said secondary power system before being discharged back into an aft portion of said by-pass passage.

24. An integrated aircraft system comprising an aircraft frame, a nacelle cowl mounted to said aircraft frame, a primary gas turbine engine mounted within said nacelle, a secondary power system incorporated within said nacelle cowl and being driven by a flow of air created by or through said primary gas turbine engine, an electrical power and cooling unit for supplying electrical power and cabin cooling air, said electrical power and cooling unit being pneumatically driven by engine bleed air, and said primary gas turbine engine having two bleed ports for delivering at least one of high temperature, high pressure high stage bleed air and mid-stage bleed air to said electrical power and cooling unit.

* * * * *